US011665059B2

(12) United States Patent
Balakrishnan et al.

(10) Patent No.: US 11,665,059 B2
(45) Date of Patent: May 30, 2023

(54) INTELLIGENT CARRIER AND SERVICE SELECTION FOR THE INTERNET OF THINGS

(71) Applicant: Aeris Communications, Inc., San Jose, CA (US)

(72) Inventors: Subramanian Balakrishnan, San Jose, CA (US); Alpa Shah, San Jose, CA (US)

(73) Assignee: Aeris Communications, Inc., San Jose, CA (US)

( * ) Notice: Subject to any disclaimer, the term of this patent is extended or adjusted under 35 U.S.C. 154(b) by 0 days.

(21) Appl. No.: 16/278,916

(22) Filed: Feb. 19, 2019

(65) Prior Publication Data
US 2019/0260639 A1 Aug. 22, 2019

Related U.S. Application Data

(60) Provisional application No. 62/633,192, filed on Feb. 21, 2018.

(51) Int. Cl.
*H04L 41/0823* (2022.01)
*H04L 67/12* (2022.01)
(Continued)

(52) U.S. Cl.
CPC ...... *H04L 41/0823* (2013.01); *H04L 41/0886* (2013.01); *H04L 43/0811* (2013.01);
(Continued)

(58) Field of Classification Search
CPC . H04L 63/20; H04L 41/0806; H04L 41/0813; H04L 41/0803; H04L 63/10; H04L 63/205; H04L 67/16
See application file for complete search history.

(56) References Cited

U.S. PATENT DOCUMENTS 8,068,440 B2 11/2011 Stanwood
8,693,401 B2 4/2014 Lim
(Continued)

OTHER PUBLICATIONS

Andreev et al., Intelligent access network selection in converged multi-radio heterogeneous networks, IEEE wireless communications 21, No. 6 (Dec. 2014): 86-96, Retrieved at https://www.researchgate.net/profile/Yevgeni_Koucheryavy publication/273288668_Intelligent_Access_Network_Selection_in_Converged_Multi-Radio_Heterogeneous_Networks/links/550d9a820cf27526109a7c84.pdf.
(Continued)

*Primary Examiner* — Raj Jain
(74) *Attorney, Agent, or Firm* — Shih IP Law Group, PLLC (57) ABSTRACT

A method and system for optimizing network access of a device on a cellular network are disclosed. The method includes receiving connectivity information from a device; compiling the received connectivity information as device analytics; specifying rules to maintain connectivity of the device to a network based on the device analytics; and automatically configuring the device in response to the rules to maintain connectivity of the device to the network. The system includes a back end system for receiving connectivity information from a device; an analytic system for compiling the received connectivity information as device analytics; a rules engine for specifying rules to maintain connectivity of the device to a network based on the device analytics; and a configuration module, wherein the configuration module automatically configures the device in response to the rules to maintain connectivity of the device to the network.

18 Claims, 8 Drawing Sheets

(51) Int. Cl.
*H04L 43/0811* (2022.01)
*H04L 43/0876* (2022.01)
*H04L 41/08* (2022.01)
*H04L 9/40* (2022.01)
*H04L 41/0816* (2022.01)

(52) U.S. Cl.
CPC .......... *H04L 43/0876* (2013.01); *H04L 63/20* (2013.01); *H04L 63/205* (2013.01); *H04L 67/12* (2013.01); *H04L 41/0816* (2013.01)

(56) References Cited

U.S. PATENT DOCUMENTS

| | | | |
|---|---|---|---|
| 8,799,451 B2 | 8/2014 | Raleigh | |
| 9,148,908 B2 | 9/2015 | Bhargava | |
| 9,577,937 B2 | 2/2017 | Vasseur | |
| 9,668,223 B2 | 5/2017 | Abdelmonem | |
| 9,756,547 B2 | 9/2017 | Egner | |
| 10,116,549 B2 | 10/2018 | Altin | |
| 2006/0239200 A1* | 10/2006 | Pirzada | H04L 67/24 370/252 |
| 2008/0175206 A1* | 7/2008 | Bivens | H04W 99/00 370/331 |
| 2009/0252102 A1 | 10/2009 | Seidel | |
| 2015/0172991 A1* | 6/2015 | Petersen | H04W 40/34 370/252 |
| 2015/0188949 A1* | 7/2015 | Mahaffey | H04W 12/37 726/1 |
| 2016/0094358 A1 | 3/2016 | Won | |
| 2016/0112240 A1* | 4/2016 | Sundaresan | H04L 67/16 726/1 |
| 2016/0344841 A1 | 11/2016 | Wang | |
| 2018/0041529 A1* | 2/2018 | Mixer | H04L 63/0245 |
| 2018/0248711 A1* | 8/2018 | McCann | H04L 67/10 |
| 2019/0260639 A1* | 8/2019 | Balakrishnan | H04L 41/0823 |

OTHER PUBLICATIONS

Centenaro et al., Long-range communications in unlicensed bands: The rising stars in the IoT and smart city scenarios, IEEE Wireless Communications 23, No. 5 (2016): 60-67, Oct. 2016, Retrieved at https://arxiv.org/pdf/1510.00620.pdf.

* cited by examiner

INTELLIGENT CARRIER AND SERVICE SELECTION FOR THE INTERNET OF THINGS

CROSS-REFERENCE TO RELATED APPLICATIONS

Under 35 USC 119(e), this application claims priority to U.S. Provisional Application Ser. No. 62/633,192, entitled "INTELLIGENT CARRIER AND SERVICE SELECTION FOR THE INTERNET OF THINGS", filed on Feb. 21, 2018, which is incorporated herein by reference in its entirety.

FIELD OF THE INVENTION

The embodiments described herein relate generally to cellular networks and more particularly to the cellular carrier and service selection for devices connected to the cellular network.

BACKGROUND OF THE INVENTION

Many Internet-of-Things (IoT)/Machine-to-Machine (M2M) solutions, particularly running on moving machines, for example, vehicles, require continuous connectivity with cellular or other wireless networks for proper working of applications running on those machines.

SUMMARY OF THE INVENTION

In one example embodiment, a computer-implemented method for optimizing network access of a device on a cellular network is disclosed. The method includes receiving connectivity information from a device; compiling the received connectivity information as device analytics; specifying rules to maintain connectivity of the device to a network to a network based on the device analytics; and automatically configuring the device in response to the rules to maintain connectivity of the device to the network.

In another example embodiment, a system for optimizing network access of a device on a cellular network is disclosed. The system includes a back end system for receiving connectivity information from a device; an analytic system for compiling the received connectivity information as device analytics; a rules engine for specifying rules to maintain connectivity of the device to a network based on the device analytics; and a configuration module, wherein the configuration module automatically configures the device in response to the rules to maintain connectivity of the device to the network.

In an embodiment, a non-transitory computer-readable medium for optimizing network access of a device is disclosed. The non-transitory computer-readable medium stores instructions that, when executed, cause one or more processors corresponding to a system having a processor, and a memory in communication with the processor perform the following operations including receiving connectivity information from a device; compiling the received connectivity information as device analytics; specifying rules to maintain connectivity of the device to a network based on the device analytics; and automatically configuring the device in response to the rules to maintain connectivity of the device to the network.

DETAILED DESCRIPTION OF THE PREFERRED EMBODIMENT

The embodiments described herein relate generally to cellular networks and more particularly to the cellular carrier and service selection for devices connected to the cellular network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the embodiments described herein are not intended to be limited to the embodiments shown but is to be accorded the widest scope consistent with the principles and features described herein.

Many Internet-of-Things (IoT)/Machine-to-Machine (M2M) solutions, particularly running on moving machines, for example, vehicles, require continuous connectivity with cellular or other wireless networks for proper working of applications running on those machines. However, no single cellular carrier may be able to provide such highly-available, continuous connectivity in all parts of even a single country and certainly not globally. As vehicles pass through dead spots with no cellular connectivity the operation of the application running at that time may be suspended. This may result in a bad user experience. For stationary devices the connectivity may be an issue due to high traffic on a particular network during a particular time of the day resulting in either a slower connectivity or no connectivity.

In both cases, it may be possible for the device to know another network provider with better coverage at the location of interest or with less traffic at the time of interest. The device may know another network provider by scanning frequencies of available networks and it also may know the preferred networks which may be stored in the device itself. The preferred networks may be predefined and/or updated at regular intervals or as needed by pushing updates when needed. A device may be configured to automatically switch from a carrier with no connectivity or slower connectivity to another carrier providing better connectivity as the vehicle hits or about to hit a dead spot, or in case of stationary devices during a particular time of the day. This proactive automatic switch by the device from using a carrier with slower or no connectivity to a carrier providing better connectivity may result in a better user experience for that application on that device due to undisturbed execution of the application.

With multiple access technologies offered by different carriers, each of which may have potentially different cost and different coverage in a particular area, the selection of which carrier and service to use may be more complex than ever. For example, Verizon and Sprint use CDMA, AT&T and T-Mobile use GSM, and all four including Verizon, Sprint AT&T and T-Mobile use LTE to name a few. The complexity may further increase with emerging Wi-Fi options offered by the various service providers using Wi-Fi hotspots. Although Wi-Fi may be generally a much lower-cost connectivity option for a stationary device, it may be currently much less available for a mobile IoT/M2M device such as a car, and if available, may be available at a cost. For example, General Motors offers built-in OnStar 4G LTE Wi-Fi hotspots (provided by AT&T) in their cars, but it comes with a cost that can increase substantially depending on the data usage, e.g. costs range from $5.00/month for 200 MB to $50/month for 5 GB for certain models. The availability of free Wi-Fi, e.g. free Wi-Fi from businesses in a particular neighborhood, is at best scarce with very limited coverage. While it is possible for the moving device to scan all available cellular/network services by scanning the frequency and/or signal strength continuously and decide which one to select just in time, based on availability and cost. This may lead to a time lag in response which may be of the order of several milliseconds or in some cases up to a second, since if the preferred network is not available, the device will look for another network, by scanning the frequency and/or signal strength, based on order of priority/preference provided to the device.

A better and faster mechanism may to use device analytics to learn about usage pattern of a device by gathering usage data for that device over a period of time. The usage data may also include connectivity data and may be captured as usage data record or connectivity data record (CDR). The usage and/or connectivity data for a device may include, for example, name of an application seeking network access, location of network access, time of network access, duration of network access, day of the week for network access, month of the network access, date of the network access, amount of data transferred per network access event, type of data transferred during the network access etc. The type of data transferred may include data transferred during usage of a particular application as well as maintenance data, downloading an application update or uploading usage data to a device analytics database, where such data may be transferred to and from the device connected to the network to various databases in cloud. The usage data and/or connectivity may also include any one or more parameters such as type of the network accessed, name of the network accessed, quality of service (QoS), cost.

The method can then use the probability of that device following a similar pattern of usage and/or connectivity data, as described above, to predict when an application may access a specific network and when the access to that specific network may be suspended due to unavailability of the network connection. For example, a particular user may use a certain application in the car to listen to music on a particular path, for a particular duration of use of that application, at a particular time of the day and on a particular day of the week, using a specific network.

Based on the data gathered about the user's use of his device, usage and/or connectivity analytics may allow an application/solution provider to provide algorithms that decide which service may most likely be the best based on time and/or location and cost, and may proactively switch to that network provider's service. For example, the connectivity module in the device may switch from one network provider or carrier to another network provider or carrier, e.g. Sprint or ATT, or from one type of connectivity to another type of connectivity, e.g., LTE or GSM (SIM based), or CDMA (non-SIM based). This switching may be achieved by automatic reconfiguration of the connectivity module in the device in response to the algorithms or rules to keep the device connected to a network before such suspension of application may occur. Since the switch from one network service provider or type of connectivity to another may be done automatically and proactively by the device before any interruption in the service may be noticed by the user of the device, and hence behind the scene for users of that application/solution. Thus, leading to a seamless user experience without undue cost to the application/solution provider.

In another embodiment described herein, maintenance data, for example, downloading an application update or uploading a device analytics database update, may be transferred to and from the device connected to the network to various databases in the cloud. The data transfer algorithms in such cases may utilize device analytics information to decide whether the data to be transferred is application use data or maintenance data. This information may then be used to decide whether to wait for availability of cheaper resources such as Wi-Fi e.g. for maintenance data, or proceed with other network service at higher cost e.g. for application usage by the user of the device, resulting in improved quality of service and cost efficiency.

The use of a particular algorithm for data transfer may further depend on various parameters including quality of service required and cost associated with such a usage along with urgency of data transfer as described above for maintenance data or application use data. For example, non-urgent data such as updating a device analytics database, downloading application updates etc. may be carried out only when the device is connected through Wi-Fi, whereas, data transfer during emergency situations may be carried out irrespective of cost efficiency. In an embodiment, the user may be able to decide if they would like to initiate data transfer at a premium resulting in better QoS rather than cheaper cost. For example, a user may choose to download a movie in a moving vehicle for their kids by paying a premium for such a service.

Thus, in an embodiment, the device usage and/or connectivity analytics may be used to learn the typical connectivity needs of each IoT/M2M device and then to update the connectivity algorithms in the local device to leverage device usage and/or connectivity analytics. A particularly unique aspect is to provide each individual device with the best algorithm for that device based on the usage patterns of that device. The algorithms may be further extended to balance urgency of data transfer, quality of service required, and cost associated with such a switch and the device may be automatically reconfigured in response to the algorithms or rules to keep the device connected to a network. The method, system and computer program product allow such service selection irrespective of the communication technology used for the IoT device and/or presence of SIM, e.g., an IoT device using GSM technology where a SIM is required for the service as well as an IoT device using CDMA technology where a SIM is not required for the service.

Figure 1A:
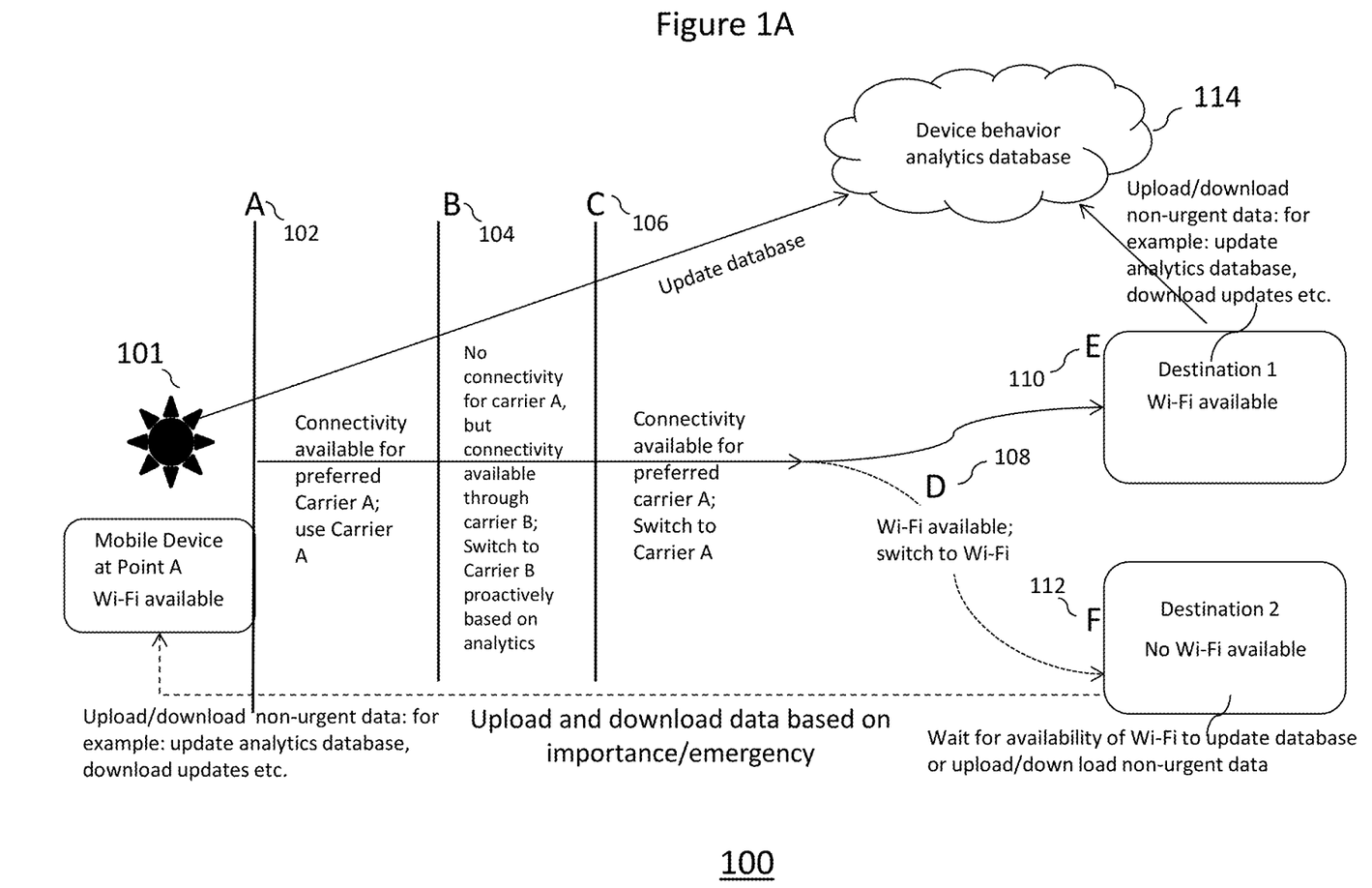
FIGS. 1A and 1B illustrate overview diagram for the method and system for intelligent carrier and service selection for a moving device and a stationary device according to an embodiment described herein.

FIG. 1A illustrates an overview diagram for the method and system for intelligent carrier and service selection according to an embodiment described herein. FIG. 1A describes a system for optimizing data transfer for a moving device 101. The device 101 may include one or more communication devices also known as connectivity module, for example, vehicles connected to the cellular network or cellular-enabled devices via SIMs (LTE/GSM) or integrated connectivity that is non-SIM based (CDMA) that are installed in the communication devices either integrated in the device 101, e.g., vehicle, itself or removably installed in the device 101. These communication devices these could be devices using a radio module and Wi-Fi, or any other wireless communication technology that are capable of transmitting relevant device data, e.g., vehicle data, to database 114 and/or a data processing system.

As shown in FIG. 1A, as the device 101 moves from point A 102 to point F 112 or point E 110, the applications running on the device 101 that require network connectivity, may go through different types of connectivity. When the device is at point A 102, it may have access to Wi-Fi; however, as it starts moving, it may lose that access.

As the device 101 with preferred carrier A moves from point A 102 to point B 104, the connectivity may be available via preferred carrier A, and the applications running on device 101 may use carrier A for network connection. However, as device 101 reaches point B, connectivity via carrier A may not be available due to inadequate coverage by carrier A or due to high traffic on network provided by carrier A, but connectivity may be available for device 101 via another carrier, for example, carrier B.

Generally, the applications running on the device that require network connectivity may be either suspended due to this lack of connectivity or start searching for other network service provided by a different carrier. Searching for availability of a different carrier network at this point may result in suspension or slowing of application and a bad user experience.

A better and faster mechanism may be to use device analytics to learn about usage and/or connectivity pattern of a device by gathering usage and/or connectivity data for that device over a period of time and use the device analytics data to proactively provide access to better network e.g. in terms of QoS, cost etc., or faster network available. For example, the usage and/or connectivity data for a device may include any of, name of an application seeking network access, time of network access, duration of network access, day of the week for network access, month of the network access, date of the network access amount of data transferred per network access event, type of data transferred during the network access, etc. The usage and/or connectivity data may also include any one or more parameters such as type of the network accessed, name of the network accessed, quality of service (QoS), cost.

Therefore, based on device analytics data gathered for device 101, if device 101 passes through the same route at the same time every day and needs network access at, for example, point B, the device 101 may be configured to proactively switch to carrier B as the device 101 approaches point B where carrier A does not have network connectivity or has slow connectivity and carrier B has a better connectivity.

Thus, automatically reconfiguring the device 101 in response to the rules to switch to another carrier with better connectivity as the device 101 hits or about to hit a dead spot may result in better user experience for that application. Once the device behavior analytics database is populated with data collected regarding location and/or time-based connectivity needs for that device and its success rate for achieving that connectivity with different carriers, the algorithm on the device may proactively reconfigure the device to switch from Carrier A to Carrier B that offers better connectivity at that location and/or time.

However, this better connectivity may be costly since it may not be the preferred carrier. As the device 101 proceeds to point C 106, where the connectivity may be available again through Carrier A, the algorithm on the device 101 may proactively reconfigure the device to switch from Carrier B to Carrier A that offers good connectivity at a lower cost. As shown in FIG. 1, as the device 101 passes through patch D 108 with public access Wi-Fi, since it may be a cheaper option, the algorithm on the device may proactively reconfigure the device from using Carrier A to using Wi-Fi, and then back to using Carrier A as the public access Wi-Fi connectivity patch D 108 is over. The device 101 may have Wi-Fi access as it passes through patch D 108, but only for a short period of time, and may or may not have Wi-Fi access based on destination; for example, Wi-Fi may be available at destination 1, point E 110; whereas, Wi-Fi may not be available at destination 2, point F 112.

The method, system and computer program product allow service selection irrespective of the communication technology used for the IoT device and/or presence of SIM, e.g., an IoT device using GSM technology where a SIM is required for the service as well as an IoT device using CDMA technology where a SIM is not required for the service.

An example of device configuration/reconfiguration algorithm that is sent to or resides on the device agent which is a device processor is shown below:

| Sample Configuration Files uploaded to device | | |
|---|---|---|
| File-1. | default_pref.config | |
| c1 | profile1 | |
| c2 | profile2 | |
| c3 | profile3 | |
| File-2. | loc_carrier_pref.config | |
| loc 1 c3 | profile3 | radius 1 |
| loc 2 c2 | profile2 | radius 2 |
| loc 3 c2 | profile2 | radius 3 |
| File-3. | time_slots_for_low_usage.config | |
| start_time 1 | end_time 1 | |
| start_time 2 | end_time 2 | |
| start_time 3 | end_time 3 | |
| Device_network_switch agent psuedo code | | |

```
//Load configuration files with carrier preferences
default_pref_stack = load_file ("default_pref.config")
//load location based prefrences
loc_pref = load_file ("loc_carrier_pref.config")
//load prefreable time slots
time_pref = load_file ("time_slots_for_low_usage.config")
//lookup if preemptive switch need be done. Based on current location and
prefreed carriers
cur_location = get_current_lat_and_long_from_gprs_sensor ( )
new_preferred_carrier = lookup location_based_preferrence
(cur_location)
if ( new_preferred_carrier is not empty)
{
    //Push new_preferred_carrier at the top/beginning of
    default_prefs list
    default_pref_stack = default_pref_stack.push
    ( new_preferred_carrier)
}
```

Sample Configuration Files uploaded to device

```
//switch carrier
netwrok_connected = false;
//Switch carrier based on prefrence order. If preferred network is not
available go to next
do
{
preferred carrier = default_pref_stack.pop( )
if ( current_carrier is not equl to preferred_carrier)
        switch to current_carrier based on prefrence order in default
        network_connected = switch_network (preferred_carrier ) //
return true if connection is successful
}
until ( network_connected ! = true)
//send data if connectivity is established
if (network_connected == true )
{
        good_to_go = false
        //if low priority, check if it is preferred time
        if (data -> priority == low ) {
        for (lineitem in time_pref) {
                get start_time and end_time
                if current_time > start_time and current_time < end_time
                        good_to_go = true;
                        break;
        }
}
//if high priority, it is
else if ( data -> priority == high )
        good_to_go = true;
if ( good_to_go = = true )
        send_date ( )
}
//end
```

The device behavior analytics database 114 may also contain data regarding time spent by the device 101 at each destination. For example, a vehicle may be parked at home (e.g. point A) during night where connectivity via Wi-Fi may be available, and may be parked at office (e.g. point E), during week days where Wi-Fi may be available and may be parked at a school (e.g. point F), during weekday evenings where Wi-Fi may not be available. Based on this information and based on amount of data to be transferred and urgency of data transfer the system may make intelligent decisions to implement different data transfer algorithms.

Data transfer which is not time-sensitive, for example, downloading an application update or uploading a device analytics database update may wait for availability of cheaper resources such as Wi-Fi whereas data transfer that is time sensitive, for example, emergency services, traffic/severe weather alerts may be carried out instantly without considering cost associated with such usage. Therefore, if non-urgent data transfer is expected to take more time than the amount of time the device 101 is expected to spend at point E 110, based on device behavior analytics, the algorithm implemented may configure the device to defer the data transfer until the device 101 reaches point A 102 where it is expected to have more time available for carrying out such data transfer. The urgency of data transfer may also be classified into more than two classes based on user requirements and application specifications. The exemplary process flow for the method and system described above is illustrated in FIG. 2 and described in the description accompanying FIG. 2.

Figure 1B:
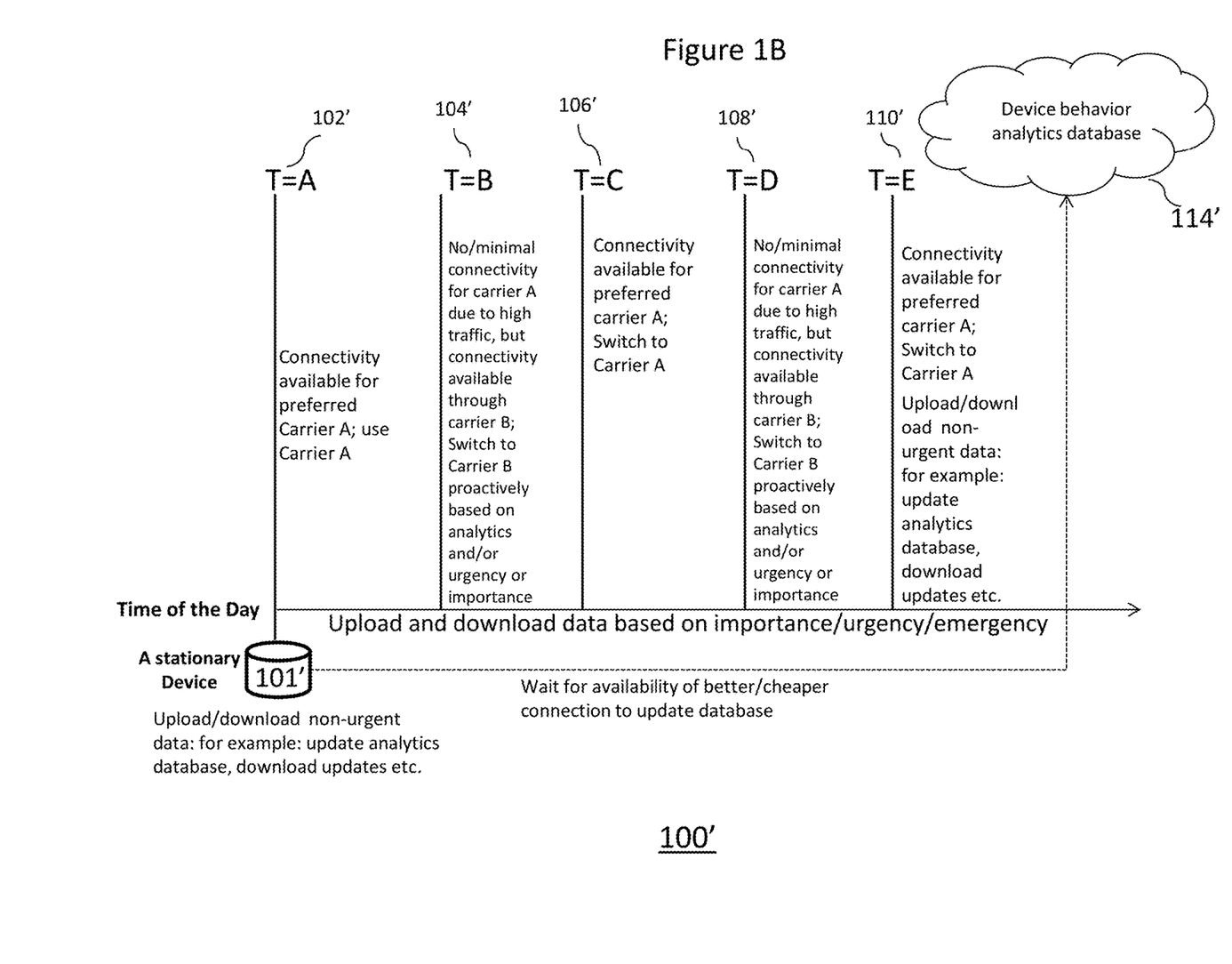

FIG. 1B describes an exemplary system and method for optimizing data transfer for a stationary device 101' where connectivity may be an issue due to high traffic during a particular time of the day or particular day of the week or a combination thereof. As shown in FIG. 1B, as the day goes by from time T=A 102' to time T=E 110', the applications running on the device 101' that require network connectivity may go through different types of connectivity. At time T=A 102', the device 101' with preferred carrier A may have access to Wi-Fi or good connectivity may be available via preferred carrier A; however, as time goes by, it may lose that connectivity or may experience slower connectivity due to increased traffic on the carrier A's network. As the time changes from time T=A 102' to point time T=B 104' the device 101' may experience no connectivity via carrier A but connectivity may be available via another carrier, for example, carrier B.

Generally, the applications running on the device 101' that require network connectivity may be either suspended due to this lack of connectivity or start searching for other network service provided by a different carrier. Searching for availability of a different carrier network at this point may result in suspension of application or slower execution of the application which may lead to intermittent loss is service and a bad user experience.

A better and faster mechanism may be to use device analytics to learn about usage and/or connectivity pattern of a device 101' by gathering usage and/or connectivity data for that device over a period of time and use the device analytics data to proactively provide access to better network e.g. in terms of QoS, cost etc., or faster network available. For example, the usage and/or connectivity data for a device may include any of, name of an application seeking network access, location of network access, time of network access, duration of network access, day of the week for network access, month of the network access, date of the network access, amount of data transferred per network access event, type of data transferred during the network access, etc. The usage and/or connectivity data may also include any one or more parameters such as type of the network accessed, name of the network accessed, quality of service (QoS), cost.

Therefore, based on device analytics data gathered for the device 101', if device 101' needs same the network access at a certain time of the day, for example, T=B, the device 101' may be configured to proactively switch to carrier B as the device 101' approaches T=B where carrier A does not have network connectivity or has slow connectivity and carrier B has a better connectivity.

Thus, reconfiguring the device 101' to switch to another carrier with better connectivity as the device 101' hits, or is about to hit a time span with limited or zero connectivity may result in better user experience for that application. Once the device behavior analytics database is populated with data collected regarding time based connectivity needs for that device and its success rate for achieving that connectivity with different carriers, the algorithm on the device may proactively switch from Carrier A to Carrier B that offers better connectivity at that time. However, this better connectivity may be costly since it may not be the preferred carrier. The connectivity algorithm described above that is used to configure/reconfigure the device may also consider least costly alternative in such cases.

As the device proceeds to time T=C 106', where the connectivity may be available again through Carrier A, the algorithm on the device may proactively switch from Carrier B to Carrier A that may offer good connectivity at a lower cost. As shown in FIG. 1B, as the device proceeds to time T=D 108' the device may experience no connectivity or limited connectivity via carrier A but connectivity or faster connectivity may be available via another carrier, for example, carrier B. As discussed above, the algorithm on the device may proactively reconfigure the device to switch from Carrier A to Carrier B that offers better connectivity at that time. However, this better connectivity may be costly since it may not be the preferred carrier. The device connectivity algorithm may also consider least costly alternative in such cases.

The device may have access to Wi-Fi or preferred carrier A with good connectivity at time T=C 108', but only for a short period of time, and may or may not have access to Wi-Fi or preferred carrier A with good connectivity again based on the time of the day or day of the week, for example, Wi-Fi or preferred carrier A with good connectivity is not available at time T=D 108', and Wi-Fi or preferred carrier A with good connectivity is available at time T=E 110'.

In this example, the device behavior analytics database may also contain data regarding location of the device at particular time. Based on this information and based on amount of data to be transferred and urgency of data transfer the system may make intelligent decisions to implement different data transfer algorithms.

Data transfer which is not time-sensitive or location sensitive, for example, downloading an application update or uploading a device analytics database update may wait for availability of cheaper resources whereas data transfer that is time or location sensitive, for example, emergency services, traffic/severe weather alerts may be carried out instantly without considering cost associated with such usage. Therefore, if non-urgent data transfer is expected to take more time than the amount of time the device is expected to spend at time T=E 110', based on device behavior analytics, the algorithm implemented may reconfigure the device to defer the data transfer until time T=A 102' or time T=E 110' where the device is expected to have more time available for carrying out such data transfer. The urgency of data transfer may also be classified into more than two classes based on user requirements and application specifications. The exemplary process flow for the method and system described above is illustrated in FIG. 2 and described below.

Figure 2:
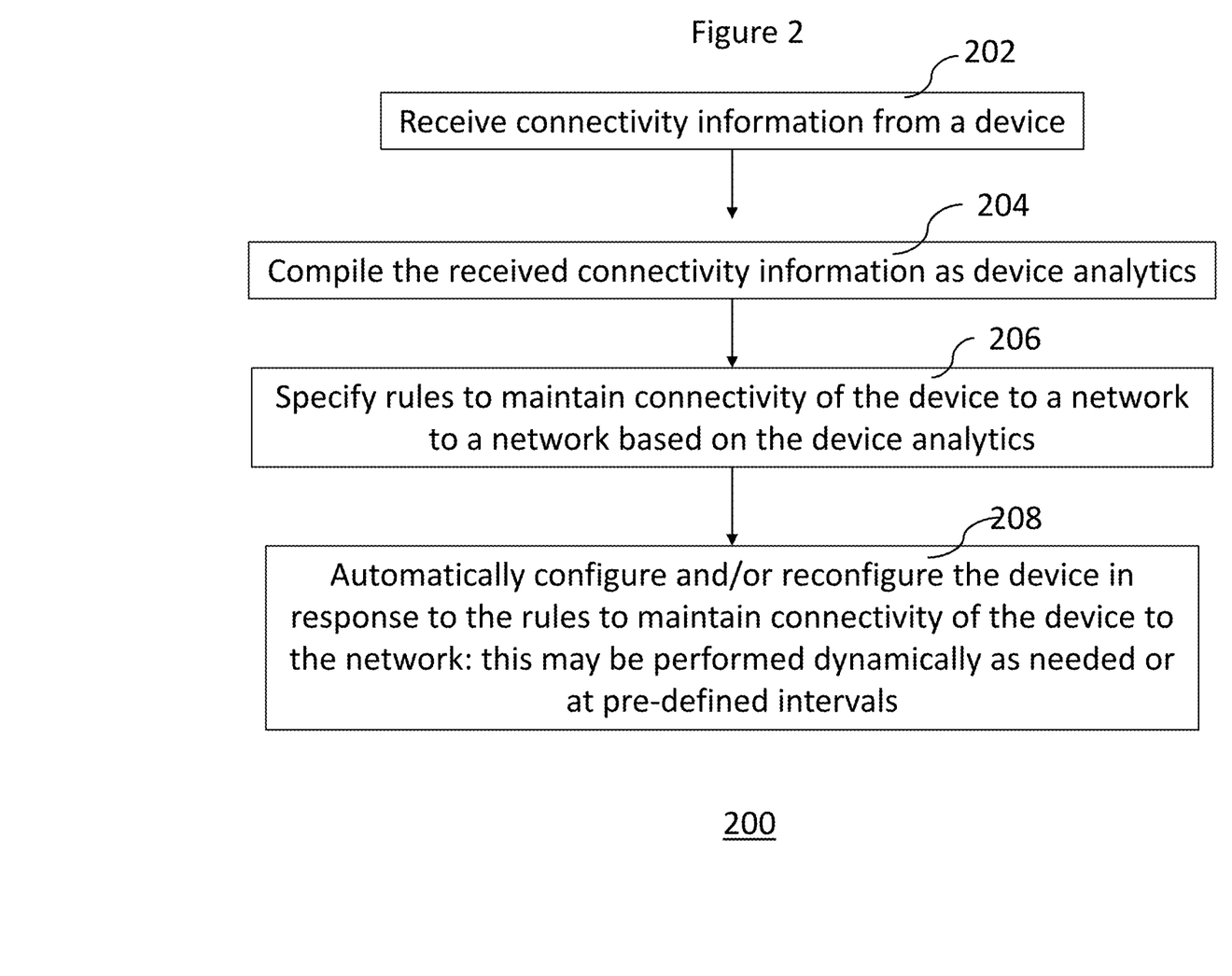
FIG. 2 illustrates an exemplary process flow for intelligent carrier and service selection for a device according to an embodiment described herein.

FIG. 2 illustrates an exemplary process flow 200 for intelligent carrier and service selection for a device according to an embodiment described herein. In one example embodiment, a computer-implemented method for optimizing network access of a device, which may be a stationary or a mobile device, on a cellular network is disclosed. The method includes receiving connectivity information from a device via step 202. The received connectivity information is then compiled as device analytics via step 204. The method further includes specifying rules to maintain connectivity of the device to a network to a network based on the device analytics via step 206 and automatically configuring and/or reconfiguring the device in response to the rules to maintain connectivity of the device to the network via step 208. The automatic configuration and/or reconfiguration may be performed dynamically as needed or at predefined intervals.

Detailed description of the steps described above is provided in the description accompanying FIGS. 1A, 1B, 3, 4, 5 and 6.

Figure 3:
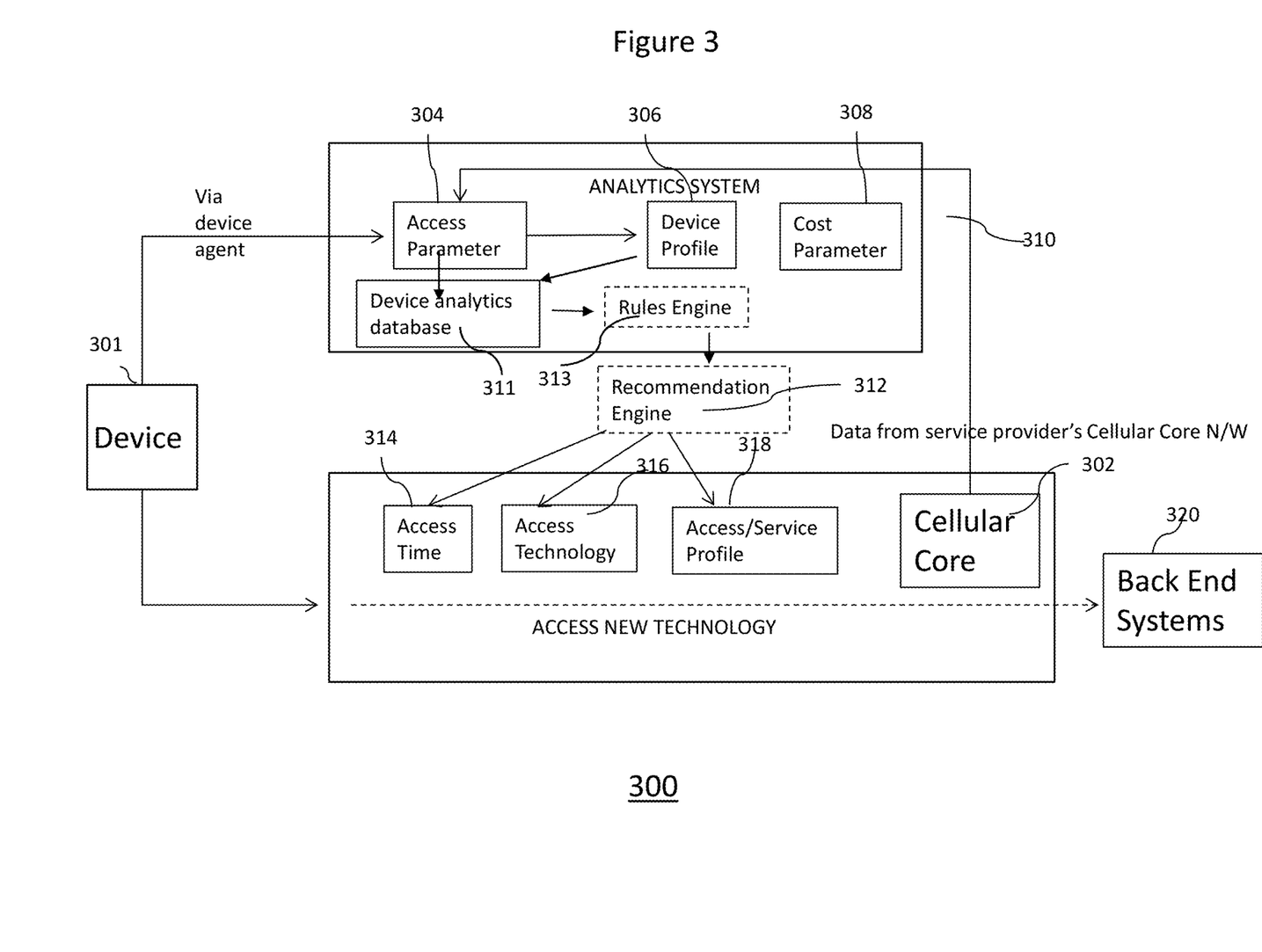
FIG. 3 illustrates a process and system for intelligent carrier and service selection according to an embodiment described herein.

FIG. 3 illustrates an exemplary system configuration 300 used for the exemplary method and system used for intelligent carrier and service selection as shown in FIGS. 1A, 1B, 2 and 6. In an embodiment, a device 301, which may be a stationary or a mobile device, may be connected to back end systems 320 with the help of a device agent installed in the device 301 via cellular core 302 which may be a connectivity platform for a network provider. Analytics system 310 may further include device analytics database 311 to receive data such as access parameter 304, device profile 306 and cost parameter 308 from the device 301 via device agent.

When the device accesses a network in a predictable manner such as at a predictable time and/or at a predictable location, the access parameters such as access technology and/or service provider may also be predictable. For example, as described above in the description accompanying FIG. 1, a device such as a vehicle may be parked at home (e.g. point A) during the night where connectivity via Wi-Fi may be available, and may be parked at office (e.g. point E), during week days where Wi-Fi may be available and may be parked at a school (e.g. point F), during weekday evenings where Wi-Fi may not be available. Or the vehicle may take the same route every weekday and may encounter same connectivity dead spots for a particular carrier or access technology on that route. The analytics system 310 may also receive access parameter 304 data from cellular core 302 of the network provider. This information gathered by the device analytics system 310 may help predict the connectivity dead spots when the vehicle travels on the same route and may need to switch from one service provider to another service provider with better connectivity or one access technology to another access technology offering better connectivity and availability of such options.

The method, system and computer program product allow such service selection irrespective of the communication technology used for the IoT device and/or presence of SIM, e.g., an IoT device using GSM technology where a SIM is required for the service as well as an IoT device using CDMA technology where a SIM is not required for the service.

For example, the analytics system 310 may receive the access data and analyzes the received data to find the optimum parameters and provide them to the recommendation engine 312. The system 300 may further comprise a rules engine 313 that provides or specifies rules to find optimum parameters. As shown in FIG. 3, the recommendation engine may or may not be a part of the analytics system. Similarly, the rules engine may or may not be a part of the analytics system. The analytics system 310 may also receive access parameter 304 data from cellular core 302 of the network provider. Based on the optimum parameters, the recommendation engine 312 may recommend an access technology 316 that may be used at that access time 314 for that access/service profile 318. This recommendation may involve considering parameters such cost, quality of service, and urgency of data exchange.

However, even when the device does not access network in the predictable manner, the analytics system 310 may receive the access data and analyze the received data to find the optimum parameters and provide them to the recommendation engine 312 based on rules specified by the rules engine 313. The analytics system 310 may also receive access parameter 304 data from cellular core 302 of the network provider. Based on the optimum parameters, the recommendation engine 312 may recommend an access technology 316 that may be used at that access time 314 for that access/service profile 318. This recommendation may involve considering parameters such cost, quality of service, and urgency of data exchange.

In an embodiment, the rules engine 313 may provide rules such that the connectivity algorithm in device 301 may overwrite the recommendation in certain emergency situations e.g. in the case of vehicle, in a crash, and may reconfigure the device to connect to the available network for crash notification even if it may not satisfy the criteria for optimum cost. The access parameters used for accessing a network by the device 301 may then be stored by the backend systems 320 and provided to the analytics system 310 to update the device access parameters 304. The exemplary process flow for the method and system described above is illustrated in FIG. 2 and described in the description accompanying FIG. 2.

Figure 4:
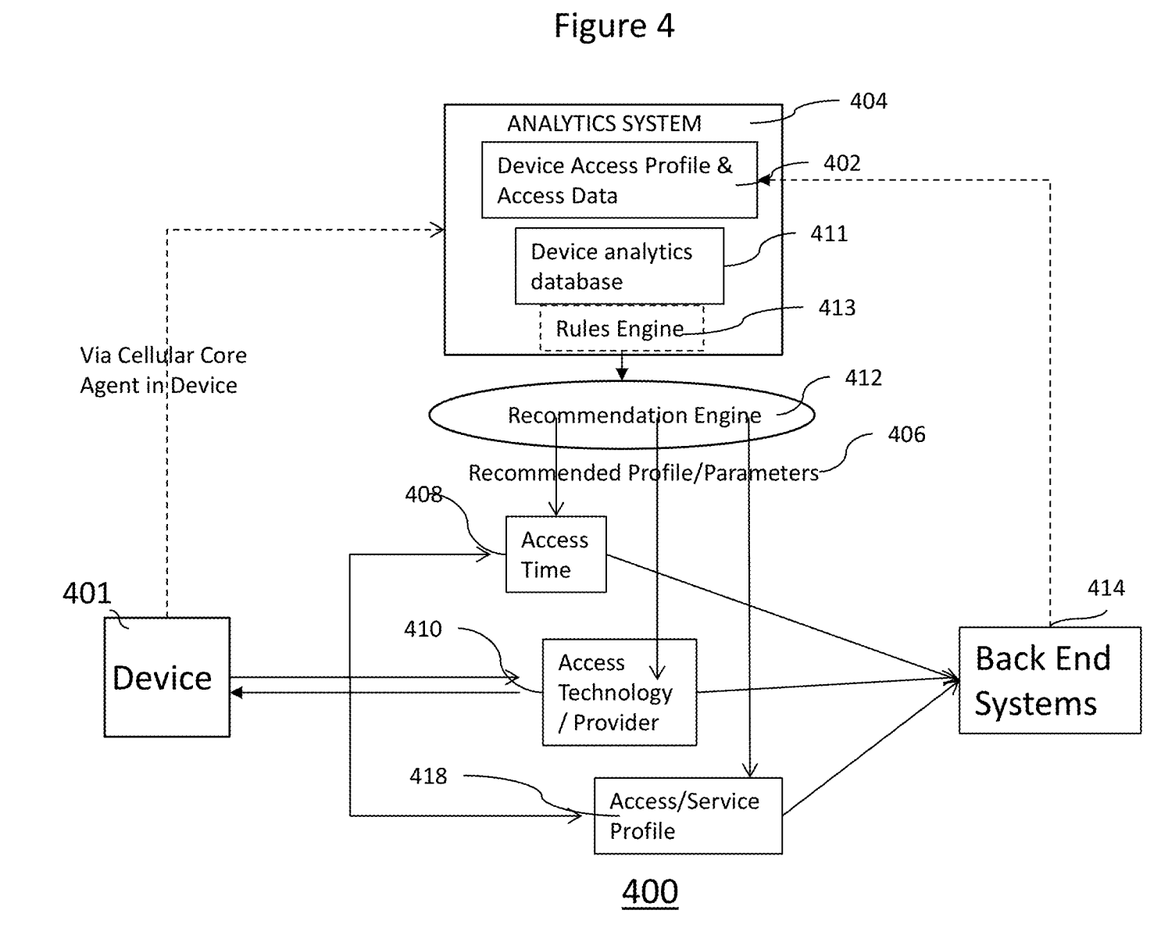
FIG. 4 illustrates a process and system for intelligent carrier and service selection according to an embodiment described herein.

FIG. 4 illustrates an exemplary system configuration 400 for the exemplary method and system used for intelligent carrier and service selection as shown in FIGS. 1A, 1B, 2 and 6. In an alternate embodiment, a device 401, which may be a stationary or a mobile device, may be connected to back end systems 414 with the help of a device agent installed in the device 401 via cellular core which may be a connectivity platform for a network provider. Analytics system 404 may further include device analytics database 411 to receive data such as device access profile and access data 402 from the device 401 via cellular core agent in the device 401. When the device 401 accesses a network, which may be a local network or a cellular network based on analytics, in a predictable manner such as at a predictable time and/or at a predictable location, the access parameters such as access technology and/or service provider may also be predictable as described above in the description accompanying FIG. 3.

For example, the analytics system 404 may receive the access data 402 and analyze the received data to find the optimum parameters and provide them to the device as recommended profile or parameters 406. The system 400 may further include a rules engine 413 that provides or specifies rules to the recommendation engine 412 which uses the rules to recommend optimum access parameters. As shown in FIG. 4, the recommendation engine may or may not be a part of the analytics system. Similarly, the rules engine may or may not be a part of the analytics system. The analytics system 404 may also receive device access profile and access data 402 via backend systems 414 of the network provider. Based on the optimum parameters the recommendation engine 412 may recommend an access technology or service provider 410 to be used at that access time 408 for that access/service profile 418. This recommendation may involve considering parameters such cost, quality of service, and urgency of data exchange.

However, even when the device does not access a network in the predictable manner, the analytics system 404 may receive the access data 402 and analyze the received data to find the optimum parameters and provide them to the device as recommended profile or parameters 406 based on the rules specified by the rules engine 413. The analytics system 404 may also receive device access profile and access data 402 via backend systems 414 of the network provider. Based on the optimum parameters the recommendation engine 412 may recommend an access technology or service provider 410 to be used at that access time 408 for that access/service profile 412. This recommendation may involve considering parameters such cost, quality of service, and urgency of data exchange.

In an embodiment, the rules engine 413 may provide rules such that the connectivity algorithm in the device 401 may overwrite the recommendation in certain emergency situations, for example, in the case of vehicle in a crash, the device may connect to the available network for crash notification even if it does not satisfy the criteria for optimum cost. The access parameters used for accessing network by the device 401 may then be stored by the backend systems 414 and provided to the analytics system 404 to update the device access profile and access data 402. The exemplary process flow for the method and system described above is illustrated in FIG. 2 and described in the description accompanying FIG. 2.

Figure 5:
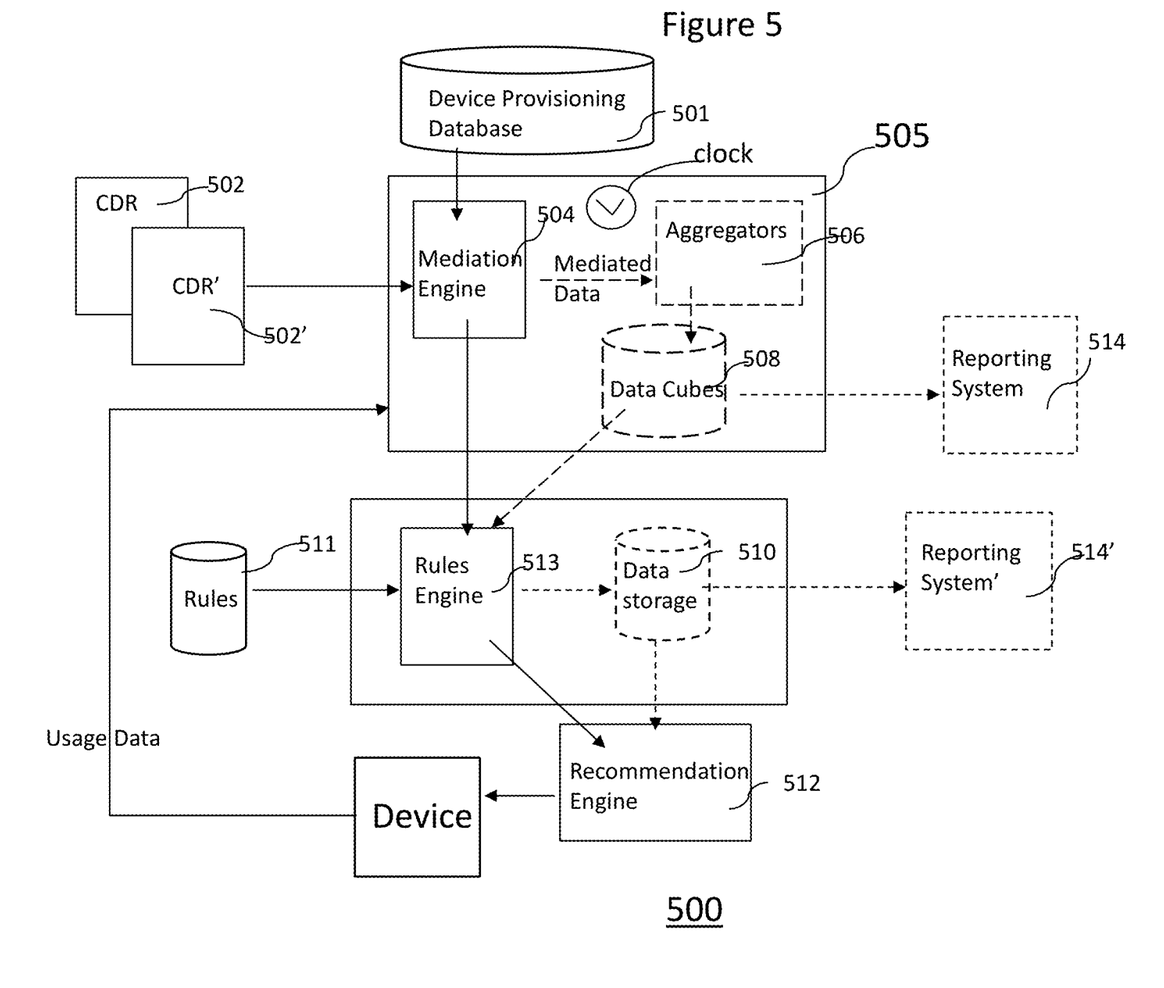
FIG. 5 illustrates an exemplary system 500 for intelligent carrier and service selection according to an embodiment described herein.

FIG. 5 illustrates an exemplary system configuration 500 for the method and system used for intelligent carrier and service selection for the exemplary method and system for optimizing network access of a device as shown in FIGS. 1A, 1B, 2 and 6 according to embodiments described herein. In an embodiment, the analytics system 505 as illustrated in FIG. 5 includes a mediation engine 504 and a rules engine 513. In an embodiment, the analytic system may additionally include aggregators 506, data cubes 508 and data storage 510. As described earlier the rules engine 513 may or may not be a part of the analytics system 505.

Connectivity data records (CDRs) 502, 502' from all network providers that were used by the device, which may be a stationary or a mobile device, are fed to mediation engine 504 to generate mediated records. The mediated records are then run through aggregators 506 periodically to generate time buckets and network usage matrix for preferred carriers. The aggregators may be triggered at a predefined clock frequency. Mediation engine may then correlate the connectivity data from CDRs from network provider with device data from device provisioning database. The aggregators 506 may also generate location, radius and carrier matrix for less preferred carriers.

Data cubes represent the data generated by the aggregators. Data storage 510 is an optional intermediate storage from where the suggestions may be stored and may be fed to recommendation engine at predefined intervals or as needed.

Recommendation engine may prioritize the suggestions from the data storage 510 and provide recommendation to the device.

An exemplary algorithm used by the system 500 illustrated in FIG. 5 is shown below. Although the example shown below may be used in conjunction with the system 500 as illustrated, a person skilled in the art may readily realize that similar algorithms with minor modifications based on the origin of data records may be used by the exemplary systems depicted in FIGS. 3 and 4.

1. Push CDRs from all carriers into Data ingestion servers
2. Feed to mediated engine to generate mediated records
3. Run periodic aggregators
   3.1 generate time buckets and network usage matrix for preferred carriers
   3.2 generate location, radius and carrier matrix for less preferred carriers
4. Generate recommendation for location and area based carrier recommendation optimum QoS
5. Generate recommendation for suggested time for lower priority data transfers.
6. Fetch edge activity data collected at device.
7. Improvise device_behavior_analytics database
8. Upload the recommendation to device_behavior_analytics database
9. Push the recommendation to device based on recommended parameters
4. Location based recommendation
   4.1 Generate location based carrier usage matrix for less preferred network
   4.2. Cluster the data to derive location and radius
   4.3 Remove the noise if switched to preferred for very short period. To reduce packet rounding penalty.
   4.4. Validate against trend data for false positive recommendation against last n days
   4.5 Add/replace recommendation for location based preferred carrier.

5. Usage based time suggestion for low priority transfer
5.1 Generate aggregated usage data for time buckets of x minutes. ex—15/30/60 minutes
5.2 Populate usage data for each bucket
5.3. Select top n buckets for a day with least usage for preferred carrier
5.4 Generate similar lists to handle lesser preferred carrier also.
5.5 Validate with patterns over last n days.
5.6 Validate against trend data for false positive recommendation and remove them.
5.7 Create/Update time slot recommendation for low priority data transfer.
7. Apply device based learning
7.1 Validate if recommended network switch did fail for last m day
7.2 Validate if preferred time slots had preferred carrier available. If not, remove time slot from recommendation FIG. 6 describes a system and method 600 for optimizing network access of an exemplary vehicle embodiment as described herein. The exemplary process flow for the method and system described above is illustrated in FIG. 2 and described in the description accompanying FIG. 2. The exemplary system configurations used for this embodiment are illustrated in FIGS. 3, 4 and 5 and are described in detail in the description accompanying FIGS. 3, 4 and 5.

Figure 6:
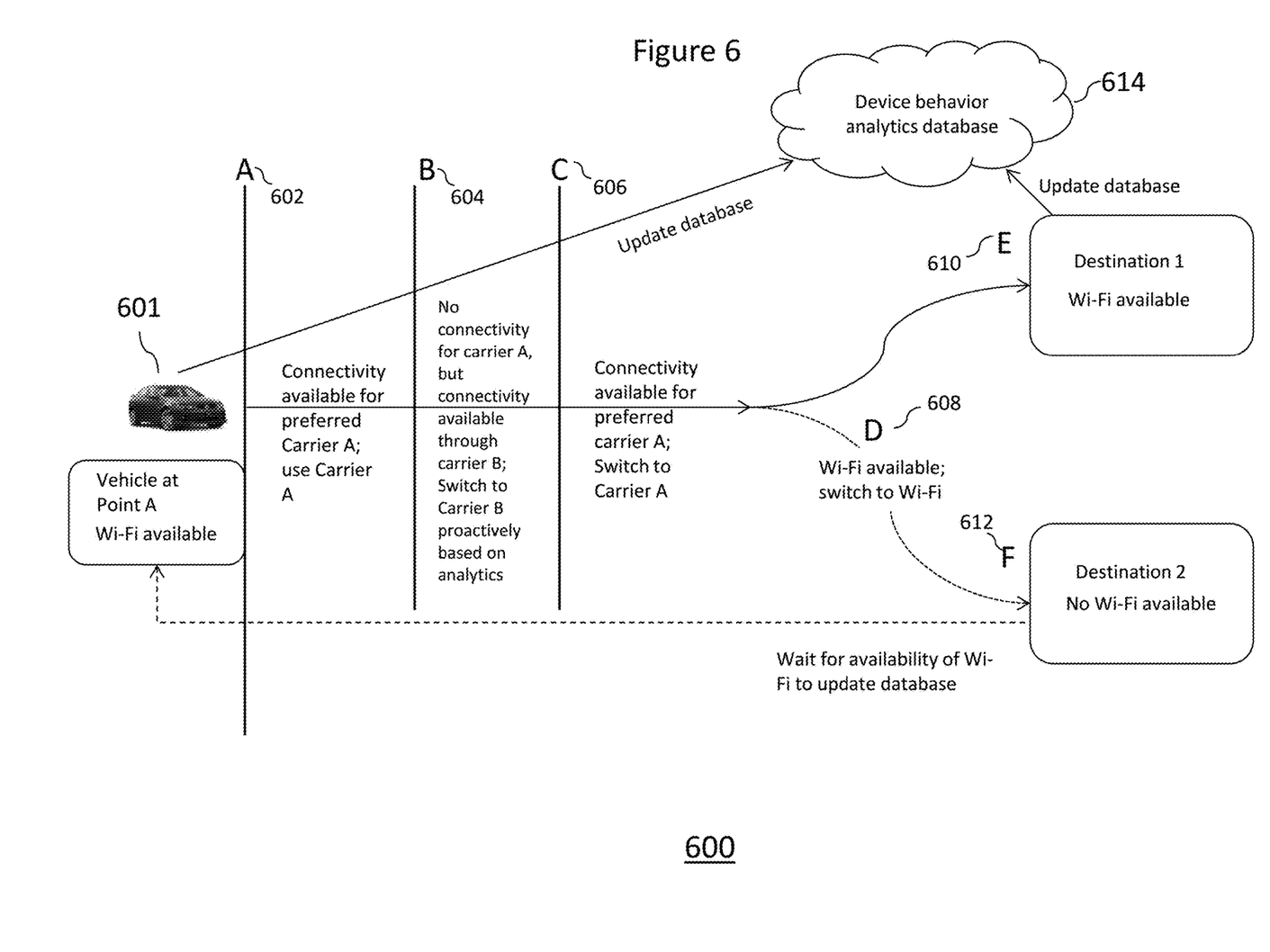
FIG. 6 illustrates a system for intelligent carrier and service selection for a vehicle according to an embodiment described herein.

A vehicle generally has tri-mode (CDMA, GSM, LTE) cellular connectivity in addition to Wi-Fi. For example, best cost-basis may be to use LTE type of connectivity (SIM based) with CDMA type of connectivity (non-SIM based) as a back-up. Telemetry data from vehicle device may be collected regarding various device parameters, for example, time, location, ability or success rate to connect to a particular network. Analytics system may be used to analyze this telemetry data across locations and ability of the vehicle to connect to a particular network. For example, during this process, the analytics system may learn that device is fixed so always has the same needs, may learn that device has typical location patterns so mostly has the same needs or may learn that device always has different needs.

In an embodiment, a connectivity algorithm where the device uses LTE with CDMA fallback as a default algorithm may work quite well. Alternatively, or additionally, for a set of vehicles or a particular vehicle, the analytics system may learn that better algorithm may be where the connectivity module in the device uses LTE with GSM fallback to provide desired level/quality of service even if cost basis is higher. Alternatively, or additionally, the analytics system may learn that it should not try LTE first at all—go straight to CDMA or straight to GSM. The method, system and computer program product allow such service selection irrespective of the communication technology used for the IoT device and/or presence of SIM, e.g., an IoT device using GSM technology where a SIM is required for the service as well as an IoT device using CDMA technology where a SIM is not required for the service. For example, the device may be configured to switch between one type of connectivity technology, e.g., SIM based (GSM/LTE) to another type of technology, e.g., non-SIM based (CDMA).

The telemetry data collected from the vehicle may change as the vehicle goes through its natural life cycle, for example, the vehicle is manufactured at a manufacturing facility, shipped into the market, at a dealer for a period of time for sale or lease, with owner 1 when sold or leased, and may go back to the same or different dealer for resale/re-lease and then to owner 2. The data collected by the device analytics database at each of these steps may represent a different usage and/or connectivity pattern. As this usage and/or connectivity pattern changes, the on-device connectivity algorithms used for configuring the device for optimum device connectivity may also change resulting in optimized network access for the device in terms of connectivity (availability), signal strength, speed, quality of service and cost etc.

In an embodiment, device analytics may be used to learn about usage and/or connectivity pattern of a device by gathering usage and/or connectivity data for that device over a period of time. The method can then use probability of that device following a usage and/or connectivity pattern learned by the analytics system as described above in the description accompanying FIG. 1, to predict when an application may be suspended or may slow down due to unavailability or lower signal strength of the network or a slow network connection. This use of analytics may allow an application/solution provider to decide which service is most likely to be the best at the current time and/or location and cost effective, and proactively switch to that network provider's service by automatically reconfiguring the device in response to the algorithms or rules to keep the device connected to a network before such suspension of application occurs. Since the switch from one network service provider to another may be done behind the scene for users of that application/solution, it leads to a seamless user experience without undue cost to the application/solution provider.

In another aspect of the invention, the data may be transferred to and from the device connected to the network to various databases in cloud, for example, downloading an application update or uploading a device analytics database update. The data transfer algorithms in such cases may utilize device analytics information to decide whether to wait for availability of cheaper resources such as Wi-Fi or proceed with other network service at higher cost for any particular data transfer resulting in improved quality of service and cost efficiency.

As shown in FIG. 6, as the vehicle 601 travels from point A 602 to point F 612, the applications running on the vehicle 601 that require network connectivity may go through patches, for example, as the vehicle 601 starts at point A 602, it may use Carrier A as it is the preferred carrier. The vehicle 601 then passes through point B 604 where network connectivity by the preferred provider, Carrier A may either be unavailable or slow. Generally, under these circumstances, the applications running on the vehicle 601 that require network connectivity may be suspended due lack of connectivity. However, once the device behavior analytics database 614 is populated with telemetry data collected regarding location based connectivity and its success rate, the algorithm on the vehicle 601 may proactively reconfigure the vehicle to switch from Carrier A to Carrier B that may offer better connectivity at that location. However, this better connectivity may be costly since it is not the preferred carrier. As the vehicle 601 proceeds to point C 606, where the connectivity may be available through Carrier A, the algorithm on the vehicle 601 may proactively reconfigure the vehicle to switch from Carrier B to Carrier A that may offer good connectivity at lower cost. As shown in FIG. 6, as the vehicle 601 passes through patch D 608 with public access Wi-Fi, since it may be a cheaper option, the algorithm on the vehicle 601 may proactively reconfigure the vehicle to switch from Carrier A to Wi-Fi, and then back to Carrier A as the public access Wi-Fi connectivity patch D 608 is over.

Although different carriers A and B are used in the above examples, same may be true in case of type of connectivity. For example, as the vehicle 601 starts at point A 602, connectivity module in it uses LTE as it is the preferred connectivity available through preferred carrier. The vehicle 601 then passes through point B 604 where network connectivity using LTE (SIM based) by the preferred provider, Carrier A, may be either slow or not available. However, carrier A may also offer back-up connectivity as CDMA (non-SIM based) and/or GSM (SIM based) albeit at a higher cost or lower speed. Therefore, as the device behavior analytics database 614 is populated with telemetry data collected regarding location based connectivity and its success rate, the algorithm on the connectivity module in the vehicle 601 may proactively reconfigure the connectivity module in the vehicle to switch from LTE to CDMA or GSM that may offer better or some connectivity at that location. Since this may be costlier or slower than LTE, as the vehicle 601 proceeds to point C 606, where the connectivity may be available using LTE, the algorithm on the connectivity module in the vehicle 601 may proactively reconfigure the connectivity module in the vehicle to switch from CDMA (non-SIM based) or GSM (SIM based) to LTE (SIM based) that may offer good connectivity at a lower cost or higher speed. Although speed and cost are used as examples of service parameters in this example, other parameters, for example, quality of service, bandwidth, etc. may also be used to make such decisions.

Using Wi-Fi for mobile IoT/M2M devices may be troublesome due to issues with standard means to authenticate and authorize utilization even when public access Wi-Fi may be available. Wi-Fi access at fixed locations such as home or office may be much more likely in the near term for devices such as vehicles. This means that a vehicle (the connectivity module in a vehicle) may begin each day with Wi-Fi access, may switch to cellular service during the trip to the office, and may have Wi-Fi access at the office, cellular service back home, and the Wi-Fi access at home again.

The analytics system along with the telemetry data from the vehicle may learn this pattern or variation of this pattern. The system may then use this information to make intelligent decisions to implement different data transfer algorithms. For example, data transfer which is not time-sensitive may be deferred to the time when the vehicle is most likely to have Wi-Fi access rather that utilizing costly cellular service. This may lead to higher cost efficiency without compromising service efficiency.

Figure 7:
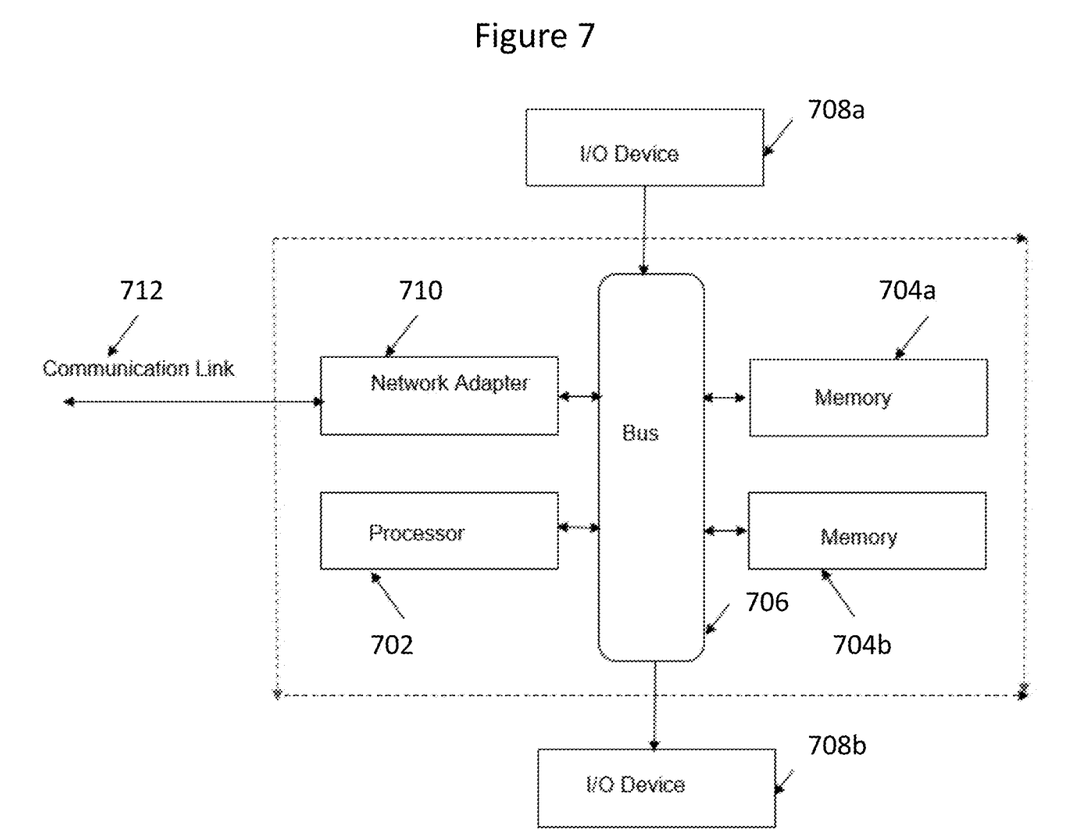
FIG. 7 illustrates a data processing system 700 suitable for storing the computer program product and/or executing program code relating to the intelligent carrier and service selection in accordance with an embodiment described herein.

FIG. 7 illustrates a data processing system 700 suitable for storing the computer program product and/or executing program code for optimizing network access of a device, which may be a stationary or a mobile device, using the system and method described in the preceding description of figures in accordance with one or more embodiments of the present invention. The data processing system 700 includes a processor 702 coupled to memory elements 704*a-b* through a system bus 706. In other embodiments, the data processing system 700 may include more than one processor and each processor may be coupled directly or indirectly to one or more memory elements through a system bus.

Memory elements 704*a-b* can include local memory employed during actual execution of the program code, bulk storage, and cache memories that provide temporary storage of at least some program code in order to reduce the number of times the code must be retrieved from bulk storage during execution. As shown, input/output or I/O devices 708*a-b* (including, but not limited to, keyboards, displays, pointing devices, etc.) are coupled to the data processing system 700. I/O devices 708*a-b* may be coupled to the data processing system 700 directly or indirectly through intervening I/O controllers (not shown).

In FIG. 7, a network adapter 710 is coupled to the data processing system 702 to enable data processing system 702 to become coupled to other data processing systems or remote printers or storage devices through communication link 712. Communication link 712 can be a private or public network. Modems, cable modems, and Ethernet cards are just a few of the currently available types of network adapters.

Embodiments of the process described herein can take the form of an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the words "preferable", "preferably" or "preferred" in the description above indicates that the feature so described may be more desirable, it nonetheless may not be necessary and embodiments lacking the same may be contemplated as within the scope of the invention, that scope being defined by the claims that follow. In addition, it should be understood that while the use of words indicating a sequence of events such as "first" and "then" shows that some actions may happen before or after other actions, embodiments that perform actions in a different or additional sequence should be contemplated as within the scope of the invention as defined by the claims that follow.

As used herein, the term "wireless or cellular communication" is understood to include various methods of connecting any type of computing or communications devices, servers, clusters of servers, using wired and/or wireless communications networks and/or cellular communication networks to enable processing and storage of signals and information, and where these services may be accessed by applications available through a number of different hardware and software systems, such as but not limited to a web browser terminal, mobile application (i.e., app) or similar, and regardless of whether the primary software and data is located on the communicating device or are stored on servers or locations apart from the devices.

As used herein the terms "device", "appliance", "terminal", "remote device", "wireless asset", etc. are intended to be inclusive, interchangeable, and/or synonymous with one another and other similar communication-based equipment for purposes of the present invention, even though one will recognize that functionally each may have unique characteristics, functions and/or operations which may be specific to its individual capabilities and/or deployment.

Similarly, it is envisioned by the present invention that the term "cellular network" includes networks using one or more communication architectures or methods, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, 5G, wireless local area network (WIFI), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A computer-implemented method for optimizing continuous network access of a device; the method comprising:
   receiving connectivity and usage information from a device;
   compiling the received connectivity and usage information as device analytics;
   determining availability of one or more networks other than a currently used network from the connectivity and usage information in case of slower connectivity or no connectivity by the currently used network;
   specifying rules to maintain continuous connectivity of the device to at least one of the one or more available networks based on the device analytics; and
   automatically configuring the device in response to the rules to proactively switch to the at least one of the one or more available networks other than the currently used network to maintain continuous connectivity of the device to the at least one of the one or more available networks.

2. The computer-implemented method of claim 1, wherein the connectivity and usage information comprises any of: name of an application seeking network access, name of network access provider, type of connectivity used, time of connectivity, duration of connectivity, amount of data transferred per network access event, type of data transferred during the network access, location of the device, success of connectivity, cost of connectivity, quality of service or a combination thereof.

3. The computer-implemented method of claim 1, wherein maintaining continuous connectivity of the device to at least one of one or more available networks comprises switching network access from any of a network, type of connectivity or a combination thereof to any of another network, type of connectivity or a combination thereof.

4. The computer-implemented method of claim 1, wherein the rules to maintain continuous connectivity of the device to a network further comprise overwriting a connectivity recommendation resulting from device analytics in an emergency situation.

5. The computer-implemented method of claim 1, further comprising:
   specifying rules for the device to transfer data based on the device analytics; and
   automatically configuring the device in response to the rules to transfer data to and from the device.

6. The computer-implemented method of claim 5, wherein rules for the device to transfer data depend on connectivity information and any of amount of data to be transferred, urgency of data transfer, location of data transfer or a combination thereof.

7. A system for optimizing continuous network access of a device, the system comprising:
   a back-end system for receiving connectivity and usage information from a device;
   an analytics system for compiling the received connectivity and usage information as device analytics and determining availability of one or more networks other than a currently used network from the connectivity and usage information in case of slower connectivity or no connectivity by the currently used network;
   a rules engine, wherein the rules engine specifies rules to maintain continuous connectivity of the device to at least one of the one or more available networks based on the device analytics; and
   a configuration module, wherein the configuration module automatically configures the device in response to the rules to proactively switch to the at least one of the one or more available networks other than the currently used network to maintain continuous connectivity of the device to the at least one of the one or more available networks.

8. The system of claim 7, wherein the connectivity and usage information comprises any of: name of an application seeking network access, network access provider, type of connectivity used, time of connectivity, duration of connectivity, amount of data transferred per network access event, type of data transferred during the network access, location of the device, success of connectivity, cost of connectivity, quality of service or a combination thereof.

9. The system of claim 7, wherein the rules to maintain continuous connectivity of the device to at least one of one or more available networks based on the device analytics further comprise overwriting recommendation resulting from device analytics in an emergency situation.

10. The system of claim 7, wherein maintaining continuous connectivity of the device to a network comprises switching network access from any of a network, type of connectivity or a combination thereof to any of another network, type of connectivity or a combination thereof.

11. The system of claim 7, wherein
   the rules engine further specifies rules for the device to transfer data based on the device analytics; and
   the configuration module automatically configures the device in response to the rules to transfer data to and from the device.

12. The system of claim 11, wherein rules for the device to transfer data depend on connectivity information and any of amount of data to be transferred, urgency of data transfer, location of data transfer or a combination thereof.

13. A non-transitory computer-readable medium storing instructions that, when executed, cause one or more processors corresponding to a system for optimizing continuous network access of a device having a processor, and a memory in communication with the processor perform the following operations comprising:

receiving connectivity and usage information from a device;

compiling the received connectivity and usage information as device analytics;

determining availability of one or more networks other than a currently used network from the connectivity and usage information in case of slower connectivity or no connectivity by the currently used network;

specifying rules to maintain continuous connectivity of the device to at least one of the one or more available networks based on the device analytics; and automatically configuring the device in response to the rules to proactively switch to the at least one of the one or more available networks other than the currently used network to maintain continuous connectivity of the device to the at least one of the one or more available networks.

14. The non-transitory computer-readable medium of claim 13, wherein the connectivity and usage information comprises any of: name of an application seeking network access, name of network access provider, type of connectivity used, time of connectivity, duration of connectivity, amount of data transferred per network access event, type of data transferred during the network access, location of the device, success of connectivity, cost of connectivity, quality of service or a combination thereof.

15. The non-transitory computer-readable medium of claim 13, wherein to maintain continuous connectivity of the device to at least one of one or more available networks comprises switching network access from any of a network, type of connectivity or a combination thereof to any of another network, type of connectivity, or a combination thereof.

16. The non-transitory computer-readable medium of claim 13, wherein the rules to maintain continuous connectivity of the device to a network based on the device analytics further comprise overwriting recommendation resulting from device analytics in an emergency situation.

17. The non-transitory computer-readable medium of claim 13, further comprising:

specifying rules for the device to transfer data based on the device analytics; and automatically configuring the device in response to the rules to transfer data to and from the device.

18. The non-transitory computer-readable medium of claim 17, wherein rules for the device to transfer data depend on connectivity information and any of amount of data to be transferred, urgency of data transfer, location of data transfer, or a combination thereof.

* * * * *